April 23, 1957 G. DUCOFF 2,790,120
TEMPERATURE RESPONSIVE SERVOMOTOR SYSTEM
Filed Sept. 15, 1953

INVENTOR.
GEORGE DUCOFF
BY
M. A. Hobbs
ATTORNEY

United States Patent Office 2,790,120
Patented Apr. 23, 1957

2,790,120

TEMPERATURE RESPONSIVE SERVOMOTOR SYSTEM

George Ducoff, China Lake, Calif., assignor to Bendix Aviation Corporation, South Bend, Ind., a corporation of Delaware Application September 15, 1953, Serial No. 380,306

4 Claims. (Cl. 318—29)

This invention relates to temperature sensing devices and more particularly to devices for sensing inlet air temperatures to gas turbine engines used in aircraft.

Because of variations in inlet air density and compressor surge considerations in gas turbine engines, it is necessary that a device be provided which is responsive to very small temperature variations of intake air. In addition, the much greater speeds and rates of climb of recently developed aircraft have made it imperative that temperature variations be corrected within extremely short periods of time. It is also necessary that such temperature sensing devices have a high degree of repeatability, i. e., they must respond to the same temperature variation in the same way every time that variation occurs. Significant values of hysteresis, or error inherent in their systems, have been prevalent in presently used mechanical temperature devices. Recent developments have made it necessary that this error factor be eliminated insofar as possible.

Accordingly, it is an object of the present invention to provide a temperature sensing device in which inherent sources of error are compensated for or substantially eliminated.

It is another object of the present invention to provide a temperature sensing device with a high degree of repeatability.

It is another object of the present invention to provide a temperature sensing device with a very short time constant over the temperature range encountered.

It is another object of the present invention to provide a temperature sensing device which is responsive to very small variations in the temperature sensed.

It is a further object of the present invention to create a highly accurate electrical signal which varies with the direction and magnitude of temperature changes.

It is a further object of the invention to convert an electrical temperature error signal into a rotational movement of a shaft such that there exists a finite position of the shaft for each inlet temperature value.

It is a further object of the invention to provide a temperature sensing device which will accomplish the above objects and which is operable from a single alternating current power supply.

Other objects and advantages will be readily apparent from the following detailed description taken in connection with the accompanying drawings in which.

Figure 1:
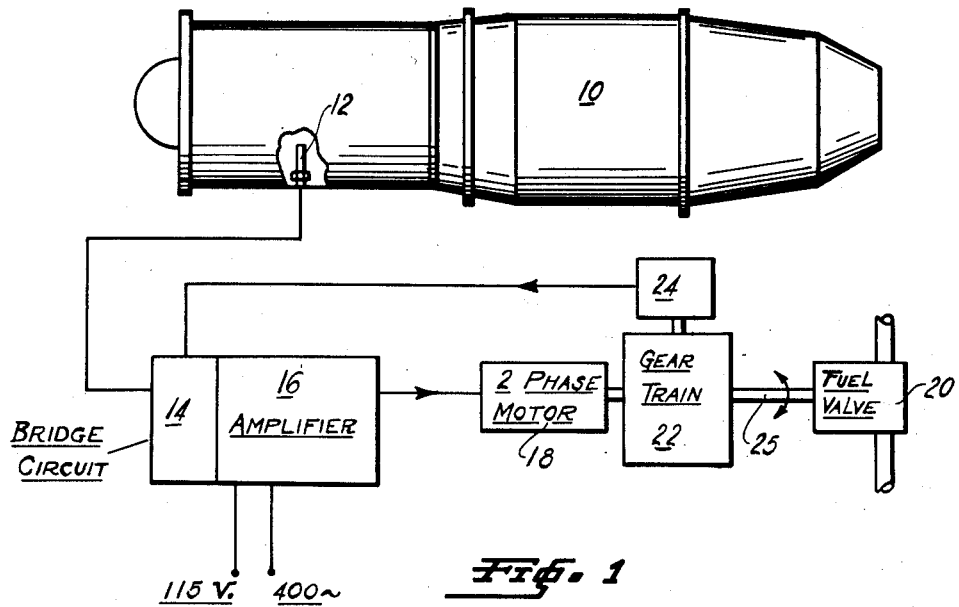
Figure 1 is a block diagram showing the individual physical units of the temperature sensing device and their application to a gas turbine engine.

With reference to Figure 1, a gas turbine engine 10 is shown with a temperature sensitive element 12 placed therein in such manner as to best expose the element to inlet air temperature. Because of the action of element 12, a signal is produced in bridge circuit 14 and amplified in amplifier 16. The signal from the amplifier is impressed upon the control winding of a two-phase motor 18 thereby creating a shaft rotation which may be used to correct fuel flow in any manner desired, either by operating directly on a fuel flow valve 20 through a gear train 22 (as shown) or by the insertion of appropriate mechanical or electrical signals to provide proper compensation for a main engine fuel metering system. A follow-up potentiometer 24 is linked to the gear train 22 and bridge circuit 14 in such a manner that its resistance will be a function of the angular position of the output shaft 25.

Figure 2:
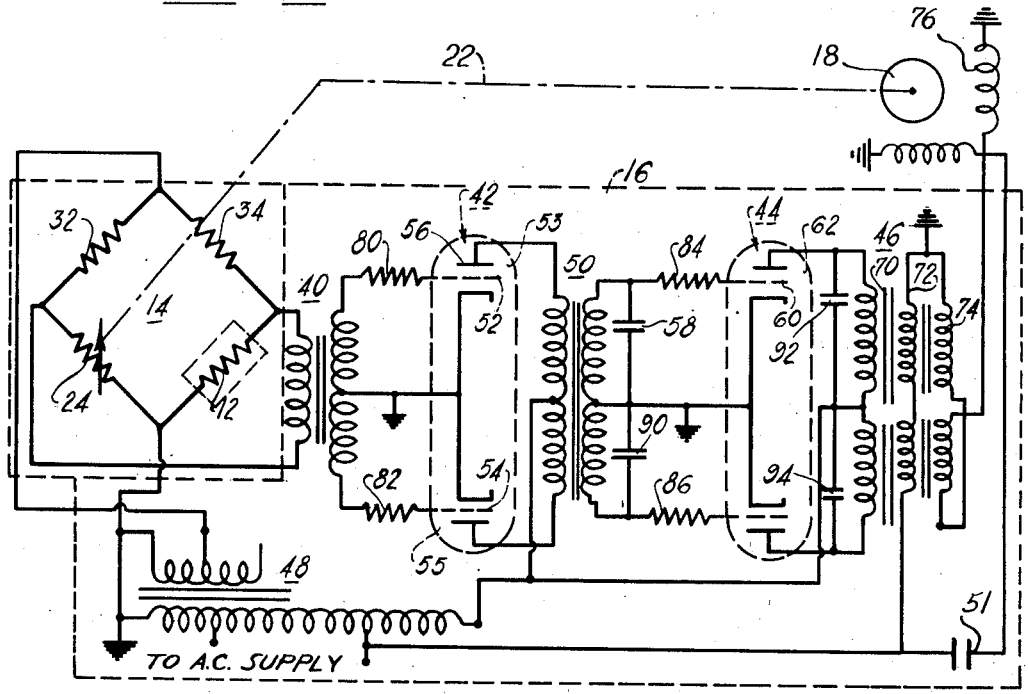
Figure 2 is a schematic wiring diagram of the temperature sensing device.

Referring to Figure 2, numeral 14 designates the resistance bridge, of which numerals 32, 34, 12 and 24 represent the resistance in the various branches. This bridge is normally balanced or tending to be balanced. Temperature signals developed in the bridge appear on the primary of transformer 40, which is the input transformer to the amplifier 16. The amplifier contains three stages of amplification through two separate branches, the first stage being through vacuum tube 42, a second stage through vacuum tube 44, and a third through magnetic amplifier 46. In the branches, one amplifies signals indicative of under temperature conditions, and the other signals indicative of over temperature conditions. Power is supplied to the system from transformer 48, which, it will be noted, supplies a voltage of higher value than the supply voltage from the primary winding. This higher voltage, connected to the center taps of the primary windings of magnetic amplifier 46 and an interstage transformer 50, serves as an anode supply for vacuum tubes 42 and 44. The alternating current supply voltage is also fed to the fixed phase winding of motor 18 through a phasing capacitor 51.

Referring more specifically to the bridge circuit 14, resistances 32 and 34 are precision fixed resistors with temperature coefficients of resistance approaching zero, numeral 12 is a resistance bulb and 24 is a "follow-up" potentiometer. The resistance bulb sensing element, which is of a type well known in the art, is so constructed that its resistance changes as a function of temperature. This bulb, as indicated in Figure 1, is a separate physical component, and is placed in the inlet air stream where its resistance will be most affected by the inlet air temperature. Resistance 24 is a precision type multiturn potentiometer made to obtain the necessary high resolution for the desired system sensitivity and has approximately zero temperature coefficient of resistivity.

The power for the bridge is supplied from the secondary of transformer 48, and is maintained at a comparatively low voltage level so that power-dissipation in the bridge components, particularly the resistance bulb, is negligible and creates no error problems.

Because of the nature of the bridge, fluctuations in power supply voltage are reflected in each of the parallel current paths and, being self-compensating, do not change the balance point, but affect only the system sensitivity. Hence, only a change in the resistance of resistance bulb 12 will develop an error voltage sufficient to actuate the system. This error voltage has a certain phase relationship, depending upon whether the temperature is over or under the value corresponding to the setting of follow-up potentiometer 24. Signals indicative of over temperature conditions are amplified in the lower branch and signals indicative of under temperature conditions are amplified in the same manner in the upper branch of the secondary of transformer 40. Transformer connections are phased such that an error signal due to an inlet air temperature change rotates the motor shaft in a direction to make the desired fuel flow correction.

Assuming an under temperature condition, current of particular phase relationship will flow through the primary winding of transformer 40 thereby inducing a voltage in the secondary. This signal will be impressed on grid 52 of triode 53 and on grid 54 of triode 55, each triode forming one-half of tube 42. Because of the phase relationship at the anode supply an amplified voltage appears only at anode 56, and hence, only across the top branch of the primary winding of interstage transformer 50. This signal induces a corresponding signal in the secondary winding which is smoothed by means of capacitor 58 before it is impressed on the grid 60 of triode 62, which forms one-half of vacuum tube 44. The signal induced in the lower half of transformer 50 is not amplified in tube 44 because it is out of phase with the anode voltage. The signal on grid 60 is further amplified and appears on the top half of the primary winding of saturable reactor or magnetic amplifier 46, causing that portion of core 70 which is linked by the top half of the primary winding to saturate, thus reducing the impedance across the top half of control winding 72. Inasmuch as this winding is directly connected from the primary winding of the power transformer 48 to ground, it will be apparent that the total voltage drop across the control winding cannot change. Therefore the reduction in IZ drop across the top half of the winding 72 will result in increased voltage drop across the lower half. This increased voltage is then reflected in the lower winding of the output coil 74 and overrides the signal on the upper winding of coil 74 thereby producing an output signal which, when impressed upon the variable phase winding 76 of motor 18, is of the proper phase to cause the motor to rotate in a direction to make the desired correction. In a fuel system as shown herein, this normally results in rotating fuel valve 20 in a flow increasing direction.

Resistors 80, 82, 84, and 86 limit the excessive flow of grid current from tubes 42 and 44. Capacitors 58 and 90 serve to tune the upper and lower branches of the secondary of interstage transformer 50, and capacitors 92 and 94 have the same function with respect to the input coils of magnetic amplifier 46.

Operation of the system is as follows: Assume a condition where the engine is operating under uniform temperature conditions. The resistance bulb 12 will have its resistance established and follow-up potentiometer 24 will be positioned at a point which balances bridge 14. No current will flow from the bridge, and there will be no current to rotate motor 18. Thus fuel valve 20, and the shaft leading to it will be stabilized at a predetermined position. Now assume that the inlet air temperature under which the engine operates becomes much lower. This change will result in a reduction in the resistance of resistance bulb 12, throwing the bridge out of balance and causing a current to flow in the primary of transformer 40. This current is of such phase relationship as to cause it to be amplified in the upper branch of the amplifier. Across variable phase winding 76 appears a signal of sufficient power and of proper phase relationship to cause motor 18 to rotate in a direction to open fuel valve 20. The rotation of motor 18 is translated through gear train 22 to follow-up potentiometer 24 which rotates in such direction as to decrease its resistance and rebalance the bridge. In this manner the movement of the output shaft 25 tends to correct and stabilize the system at any inlet air temperature at which the engine may be operated.

Should the change in temperature be an increase, rather than a decrease as in the example above, the resistance bulb 12 will increase its resistance, again unbalancing the bridge but in such manner as to cause a signal of opposite phase from that in the prior example to be induced in the secondary of transformer 40. This signal is amplified through the lower branch of the amplifier due to grid and anode voltage relationship and appears across variable phase winding 76 in opposite phase relationship to that which it has when an under temperature signal occurs. The result is a rotation of motor 18 in a direction to close valve 20, the follow-up potentiometer 24 now using said motor shaft rotation to increase its resistance, again balancing the bridge 14. Anti-hunt compensation is inherent in the system because the response curve of the resistance bulb is exponential and relatively slow.

From the foregoing description taken in connection with the appended drawings, many modifications will be apparent to those skilled in the art. For instance, considerable savings in size and weight of apparatus may be effected, where power requirements are not high, by replacing the saturable reactor with a small motor run directly off the anodes of tube 44. Therefore it should be understood that the invention is not to be limited to the particular modifications disclosed.

I claim:

1. A device for sensing inlet air temperature to gas turbine engines, comprising an electrical resistance bridge circuit of four branches, two of which contain fixed resistances approaching zero temperature coefficient of resistivity, the third containing a potentiometer approaching zero temperature coefficient of resistivity, and the fourth containing a resistance varying with temperature, said resistance so placed as to be exposed to the temperature to be sensed; a plurality of electron tube amplifying means; transformer means for coupling said amplifying means; a magnetic amplifying means; capacitors for tuning the output windings of said transformer means and the input and output windings of said magnetic amplifying means; electrical means operably connected to said magnetic amplifying means for producing a shaft movement and an alternating current power supply for said device including a transformer having a plurality of taps in which high voltage alternating current is supplied through the primary windings of said transformer coupling means to each of said electron tube amplifying means, a lower voltage is supplied to the power windings of said magnetic amplifying means, and a still lower voltage is impressed across said bridge circuit.

2. A device for sensing inlet air temperature to gas turbine engines comprising an electrical resistance bridge circuit of four branches, two of which contain fixed resistances approaching zero temperature coefficient of resistivity, the third containing a potentiometer approaching zero temperature coefficient of resistivity, and the fourth containing a resistance varying with temperature, said varying resistance so placed as to be exposed to the temperature to be sensed; a plurality of electron tube amplifying means; transformer means for coupling said amplifying means; a magnetic amplifying means; capacitors for tuning the output windings of said transformer means and the input and output windings of said magnetic amplifying means; an electrical machine with an exciting winding and a control winding; means connecting said control winding to the output winding of said magnetic amplifying means; a shaft rotated by said electrical machine; means operably connected to said shaft for varying the resistance of said potentiometer; and an alternating current power supply for said bridge circuit, said electron tube amplifying means, and said magnetic amplifying means, said power supply including a transformer having a plurality of taps in which high voltage alternating current is supplied through the primary windings of said transformer coupling means to each of said electron tube amplifying means, a lower voltage is supplied to the power windings of said magnetic amplifying means, and a still lower voltage is impressed across said bridge circuit.

3. A temperature sensing device for use in gas turbine engines comprising an electrical resistance bridge circuit of four branches, two of which contain fixed resistances approaching zero temperature coefficient of resistivity, the third containing a potentiometer approaching zero temperature coefficient of resistivity, and the fourth containing a resistance varying linearly with temperature, said varying resistance being exposed to the temperature to be sensed; transformer means across which a temperature error signal from said bridge is developed; means for amplifying said temperature error signal including a plurality of amplifier stages; transformer means coupling each of said stages, means for converting said amplified signal into a shaft rotation; means driven by said last named means for moving said potentiometer in a direction to balance said bridge, and an alternating current power supply for said device including a transformer connected across said bridge circuit and to each of said transformer coupling means for supplying power to each of said amplifier stages.

4. A device for sensing inlet air temperature to gas turbine engines comprising a resistance bridge circuit of four branches, one branch of which contains a potentiometer, and another branch of which contains a resistance differing from the other branches in thermal coefficient of resistivity, said resistance so placed as to be exposed to the temperature to be sensed; a plurality of electron tube amplifying means; transformer means for coupling said amplifying means; a magnetic amplifying means; capacitors for tuning the output windings of said transformer means and the input and output windings of said magnetic amplifying means; an electrical machine with an exciting winding and a control winding; means connecting said control winding to the output winding of said magnetic amplifying means; a shaft rotated by said electrical machine; means operably connected to said shaft for varying the resistance of said potentiometer; and an alternating current power supply for said bridge circuit and for said amplifying means including a transformer having a plurality of taps in which high voltage alternating current is supplied through the primary windings of said transformer coupling means to each of said electron tube amplifying means, a lower voltage is supplied to the power windings of said magnetic amplifying means, and a still lower voltage is impressed across said bridge circuit.

References Cited in the file of this patent

UNITED STATES PATENTS

| | | |
|---|---|---|
| 2,432,422 | Hornfeck | Dec. 9, 1947 |
| 2,450,084 | Emerson | Sept. 28, 1948 |
| 2,491,606 | Dickey et al. | Dec. 20, 1949 |
| 2,602,911 | Wild | July 8, 1952 |
| 2,616,013 | Greenlee | Oct. 28, 1952 |
| 2,639,411 | Shafer | May 19, 1953 |
| 2,662,372 | Offner | Dec. 15, 1953 |
| 2,679,621 | Houck | May 25, 1954 |
| 2,729,772 | Perkins | Jan. 3, 1956 |